US007010590B1

(12) United States Patent
Munshi

(10) Patent No.: US 7,010,590 B1
(45) Date of Patent: Mar. 7, 2006

(54) SYSTEM AND METHOD FOR SECURE TRANSACTIONS OVER A NETWORK

(75) Inventor: Anees Munshi, Woodbridge (CA)

(73) Assignee: Datawire Communications Networks, Inc., Toronto (CA)

( * ) Notice: Subject to any disclaimer, the term of this patent is extended or adjusted under 35 U.S.C. 154(b) by 869 days.

(21) Appl. No.: 09/662,975

(22) Filed: Sep. 15, 2000

Related U.S. Application Data

(60) Provisional application No. 60/153,952, filed on Sep. 15, 1999.

(51) Int. Cl.
*G06F 15/16* (2006.01)

(52) U.S. Cl. ...................................... 709/224; 713/201

(58) Field of Classification Search ........ 713/150–153, 713/201–202, 154, 200, 160–167, 178, 187–189, 713/194; 705/64, 70, 71, 75, 77, 79; 380/228, 380/259, 264, 273; 709/238–239, 223–224; 345/733–740; 370/241–254

See application file for complete search history.

(56) References Cited

U.S. PATENT DOCUMENTS

| | | | | |
|---|---|---|---|---|
| 5,251,205 A | * | 10/1993 | Callon et al. ................ | 370/392 |
| 5,394,393 A | * | 2/1995 | Brisson et al. ............... | 370/392 |
| 5,442,633 A | * | 8/1995 | Perkins et al. .............. | 370/331 |
| 5,455,865 A | * | 10/1995 | Perlman ...................... | 713/153 |
| 5,477,531 A | * | 12/1995 | McKee et al. ............... | 370/249 |
| 5,577,197 A | * | 11/1996 | Beck ............................ | 714/28 |
| 5,633,999 A | * | 5/1997 | Clowes et al. ................ | 714/6 |
| 5,706,409 A | * | 1/1998 | Yeh et al. ..................... | 358/1.6 |
| 5,724,581 A | * | 3/1998 | Kozakura .................... | 707/202 |
| 5,748,882 A | * | 5/1998 | Huang .......................... | 714/47 |
| 5,781,534 A | | 7/1998 | Perlman et al. ............. | 370/248 |
| 5,875,291 A | | 2/1999 | Fox ........................ | 395/112.13 |
| 6,621,799 B1 | * | 9/2003 | Kemp et al. ................. | 370/282 |

FOREIGN PATENT DOCUMENTS

| | | |
|---|---|---|
| EP | 0 471 090 | 2/1992 |
| EP | 0 864 959 | 9/1998 |
| WO | WO 98/56140 | 12/1998 |
| WO | WO 99/27750 | 6/1999 |

OTHER PUBLICATIONS

Burk et al., "Unix Unleashed, the Comprehensive Solution", 1998, Third Edition, pp. 283-284.*
PCT International Search Report from Application No. PCT/CA00/01073, Dated Aug. 2001.

* cited by examiner

*Primary Examiner*—Gregory Morse
*Assistant Examiner*—Tongoc Tran

(57) ABSTRACT

The public Internet is the world's largest system of internetworked computers. Adequate security means for protecting sensitive data communicated over the Internet is not, however, provided. The present invention, therefore, provides a system and method for performing secure transactions over an insecure packet-switched communication network. This is achieved by interconnecting a number of master nodes over the insecure communication network. The master nodes are capable of transmitting encrypted data packets over the insecure network via pseudo-random communication paths. The master nodes are further capable of returning to any state in a secure transaction in the event of a network failure. The master nodes are also capable of using new keys to encrypt each data packet.

4 Claims, 9 Drawing Sheets

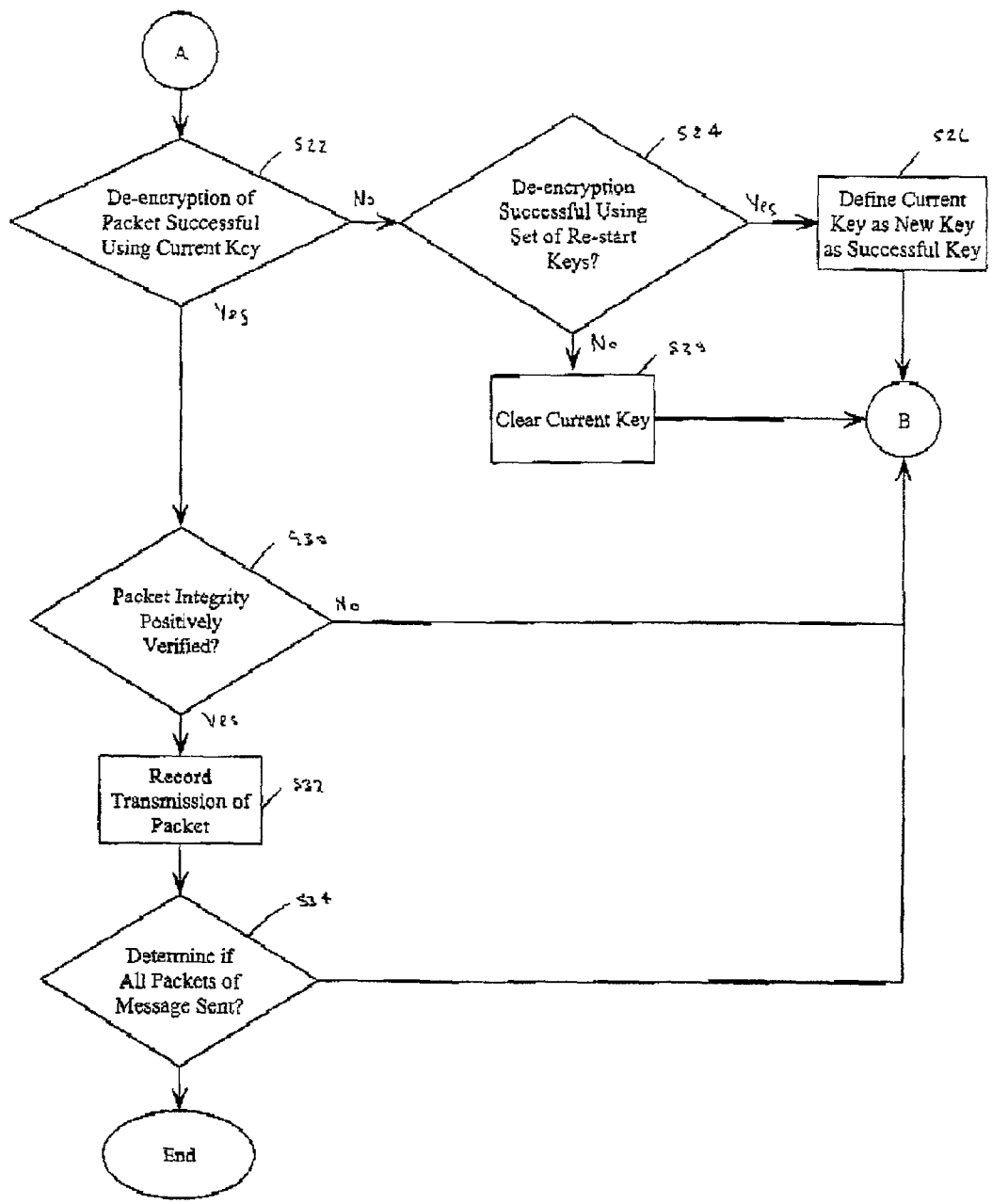
FIGURE 5A(ii)

FIGURE 5B(ii)
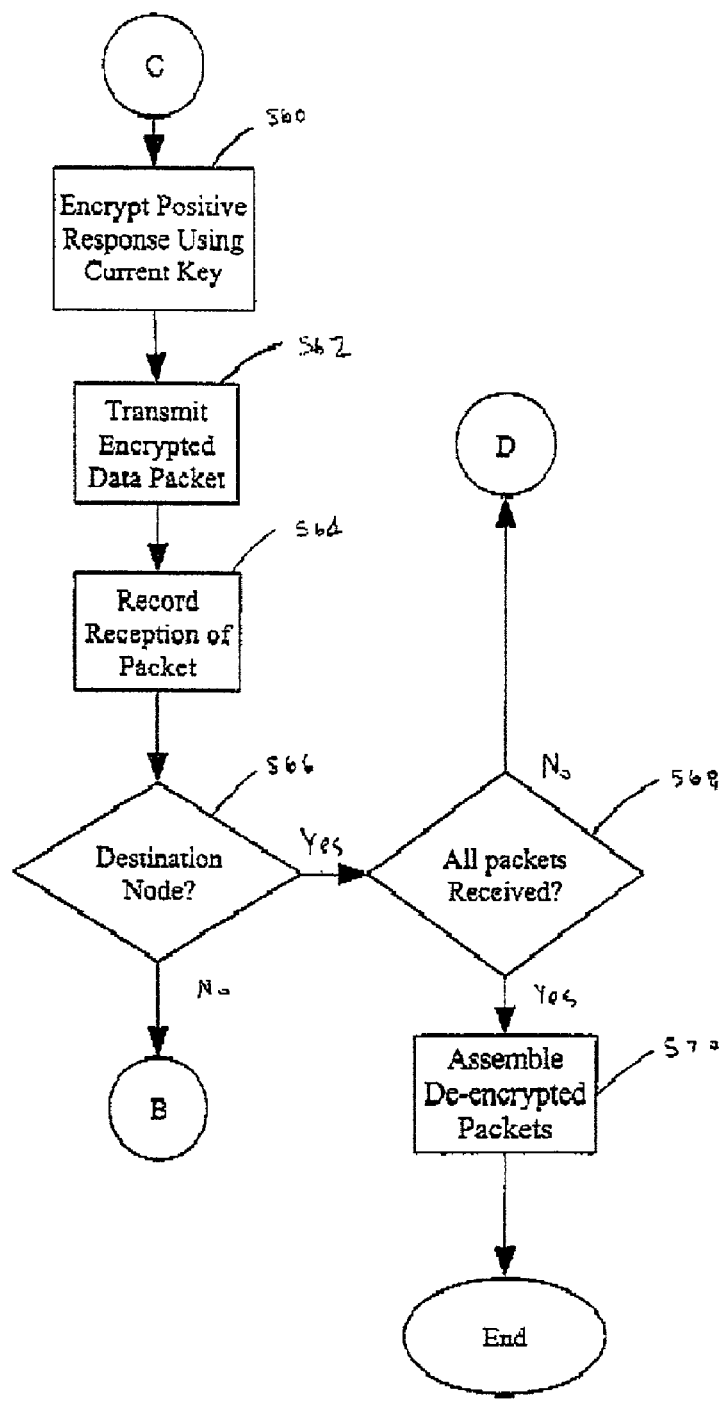

SYSTEM AND METHOD FOR SECURE TRANSACTIONS OVER A NETWORK

RELATED APPLICATIONS

This patent claims the benefit of U.S. provisional application no. 60/153,952, filed on Sep. 15, 1999.

FIELD OF THE INVENTION

The present invention relates to a method and system for secure transactions over a network and more specifically to a system and method for providing secure and reliable transactions over an un-managed Insecure communication network.

BACKGROUND OF THE INVENTION

It is well known that transaction networks are useful for providing a variety of electronic services in a secure and reliable manner. There are many examples of such transaction networks including: automatic bank teller machine networks; airline ticket kiosk networks; and credit card authorization machine networks to name a few.

A transaction network (TN) is a geographically distributed collection of interconnected computers, data-servers, and switching and routing elements that co-operate to effect a particular service. A TN typically includes one or more access points or gateways through which information is obtained from or delivered to the TN. For example, a credit card processing would typically include at least two access points. One access point for allowing end users to input and receive information to and from the TN, and a second access point for communicating that information to and from the TN to a credit card server.

Typically, transaction networks are built over private networks. A private network is one which is not available for public use. One type of private network utilized for transaction purposes is a packet-switched network. A packet-switched network is a network which transmits electronic messages by breaking up the message into smaller messages known as packets. These packets are then "switched" or transmitted over the network from a sending to receiving computer. Switching refers to a technology wherein each packet is identified by a destination address and transmitted individually over a network. Thus, unlike telephony circuit switching which requires a constant point-to-point circuit to transfer a message, packet-switching allows each message to take a different path over the network to its destination. Upon receiving the entire set of packets comprising the complete electronic message, the destination computer then assembles the packets into their proper sequence to obtain the message. A private packet-switched network is merely a packet-switched network which is unavailable for public communication purposes. Typically this is achieved by adding security features to the network to prevent access by unauthorized persons.

Private packet-switched networks are most often utilized in transaction networks as a result of the high level of security they provide. First, given the private nature of the network, it is much more difficult for potential computer hackers (thieves) to obtain access to the network. Second, as a result of the messages being transmitted via the packet-switching technology outlined above, it is much more difficult for hackers to intercept and re-assemble entire messages. This is particularly true when the individual packets are electronically encrypted before being transmitted.

One drawback to utilizing a private, packet-switched data network, however, is the excessive cost of such networks. This is because the owner of such a network must first build the network and then pay fees to maintain the associated private circuits. These maintenance costs can be significantly greater than those associated with a public data network. Furthermore, private data networks also suffer from limited availability in remote areas.

It is also well known that public packet-switched data networks, such as the Internet, offer tremendously efficient means of organizing and distributing computerized data. The cost of utilizing the Internet for transmitting data is also considerably less than that for private data networks. Furthermore, the bandwidth associated with the Internet can often greatly exceed that available to private networks. The Internet, however, has several drawbacks for interconnecting transaction networks. First, as a result of being a public network, data transmitted over the Internet is available to public viewing at all times. Second, the Internet does not offer central management or co-ordination which can provide quality of service assurances to its users. Third the routing of data between various points on the Internet can be sub-optimal resulting in inordinate network delay. Finally, the various links and routing elements utilized in the Internet can fail or become congested resulting in unpredictable network performance.

Several attempts have been made to address the aforementioned problems associated with Internet communications. One such attempt involves using encryption routers to encrypt data prior to being transmitted over the Internet. An encryption router is basically a computer which performs the function of encrypting or decrypting information which is being transmitted over a communication network. Networks which are constructed using encryption routers and public networks to connect the participating computers or networks are known as "virtual private networks" (VPN). VPNs are well known in the art of electronic data communication.

Internet-based VPNs, however, have a number of drawbacks which limit their use for secure transaction network purposes. These drawbacks are best explained with reference to FIGS. 1 and 2.

FIG. 1 shows the Open System Interconnection (OSI) standard for worldwide communications 100 as is known in the art. The standard is an ISO standard (International Organization for Standardization) which specifies standards for seven layers of computer communications. The seven layers are: (i) physical layer—for passing and receiving bits onto and from the connection medium 102; (ii) data link layer—for ensuring node to node validity and integrity of the transmission 104; (iii) network layer—for establishing the route between the sending and receiving nodes 106; (iv) transport layer—for overall end to end validity and integrity of the transmission 108; (v) session layer—for providing coordination of the communications between the connected parties as marking significant parts of the transmitted data with checkpoints to allow for fast recovery in the event of a connection failure 110; (vi) presentation layer—for negotiating and managing the way data is represented and encoded when data is transmitted between different computer types 112; and (vii) application layer—for defining the language and syntax that the programs use to communicate with other programs 114.

Referring now to FIG. 2, a schematic representation of an electronic message being communicated over a VPN is shown. Note, the transmission is shown in the context of the OSI mode referred to in FIG. 1. Starting at a source node 122, an electronic message starting "HELLO" is sent over a local area network (LAN) 124 towards the Internet 128. On route to the Internet the message is encrypted by a VPN router 126 such that the message now reads "xy01hapQU". The message is then re-transmitted over the Internet 128 towards the destination node 134. Upon the message being received at the LAN 132 to which the destination node is connected, the message is decrypted by another VPN router 130. The de-encrypted message is then forwarded to the destination node 134.

As is apparent from FIG. 2, one can see that only the un-encrypted message ("HELLO") utilizes all seven layers of the OSI model. That is to say the un-encrypted message is transmitted according to the full OSI model such that the receiving node can monitor, interpret and utilize the message within the context of the communication dialogue existing between the nodes. Referring to the VPN routers (126 and 130), however, one can see that the encrypted message only utilizes the lowest three layers of the OSI model. This means that the encrypted data only conforms to the physical, data link and network layer standards prescribed by the OSI model. The encryption and de-encryption stages are only concerned with; the physical passing of information from and onto the connection medium; the node to node validity of the message; and the route the message will follow between the sending and receiving stations (In this instance the VPN routers 126 and 130).

As a result of only utilizing the lowest three layers of the OSI model for their functions, VPNs are unable to provide a full set of redundant safeguards against lost data or failed hosts. There is no way for the network to detect these problems as this would require the encrypted message to utilize the standard prescribed in the transport layer (layer 4). Furthermore, by merely relying on the lowest three layers of the OSI model the VPN is unable to automatically recover from system crashes of individual nodes in the network. This is because the protocols for managing the dialogue between communicating parties exists in the session layer of the OSI model (layer 5). Thus, in the event of a crash or failure of an individual node in the network, the VPN would be unable to automatically determine the states of the communication parties prior to the crash. VPNs, therefore, merely provide a secure physical conduit for transmitting information from one node to the next. They do not, however, provide a secure and reliable transaction service which can compensate for various network problems such as lost packets, failed hosts or system crashes, or user needs such as transaction back-out or roll-back.

VPNs also suffer an additional drawback which negatively affects their ability to provide secure transactions. This drawback is the inability of such networks to automatically modify and update the algorithms and keys utilized for message encryption.

A need exists, therefore, for an improved method for communicating information over a public network, when it is used as a transaction network.

SUMMARY OF THE INVENTION

It is therefore an object of the invention to provide a system and method which obviates or mitigates at least one of the disadvantages described above.

One aspect of the invention is defined as a method for providing secure transactions over a packet-switched communication network comprising the steps of: transmitting a probe packet to an adjacent node; receiving a plurality of response packets to the probe specifying the capacity of a plurality of transmission paths; and transmitting a data packet to a destination node on one of the transmission paths based on the responses.

Another aspect of the invention is defined as a method for providing secure transactions over a packet-switched communication network comprising the steps of: receiving a probe from an adjacent node; forwarding the probe to at least one other adjacent node in response to receiving the probe at a node which is not a destination node; and sending a reply in response to receiving the probe, when the probe is received at a destination node.

Another aspect of the invention is defined as a method for providing secure transactions over a packet-switched communication network comprising the steps of: receiving an encrypted data packet; de-encrypting the encrypted data packet using a current encryption key; deriving a new encryption key from the current encryption key using a key generation algorithm; defining the new encryption key as the current encryption key; encrypting the data packet using the current encryption key; and transmitting the data packet to an adjacent node.

Another aspect of the invention is defined as a method for transmitting an electronic transaction message comprising a plurality of data packets comprising the steps of: adding at least one of a time stamp or a message identifier number to each of the plurality of data packets; storing a portion of each of the data packets in an electronic transaction database; and recovering a previous state of the electronic transaction database using the added at least one of a time stamp or a message identifier number.

BRIEF DESCRIPTION OF THE DRAWINGS

These and other features of the invention will become more apparent from the following description in which reference is made to the appended drawings in which.

DETAILED DESCRIPTION OF THE INVENTION

The present invention is directed to a method and system for providing a secure and reliable transactions over an un-managed insecure communication network.

Figure 3:
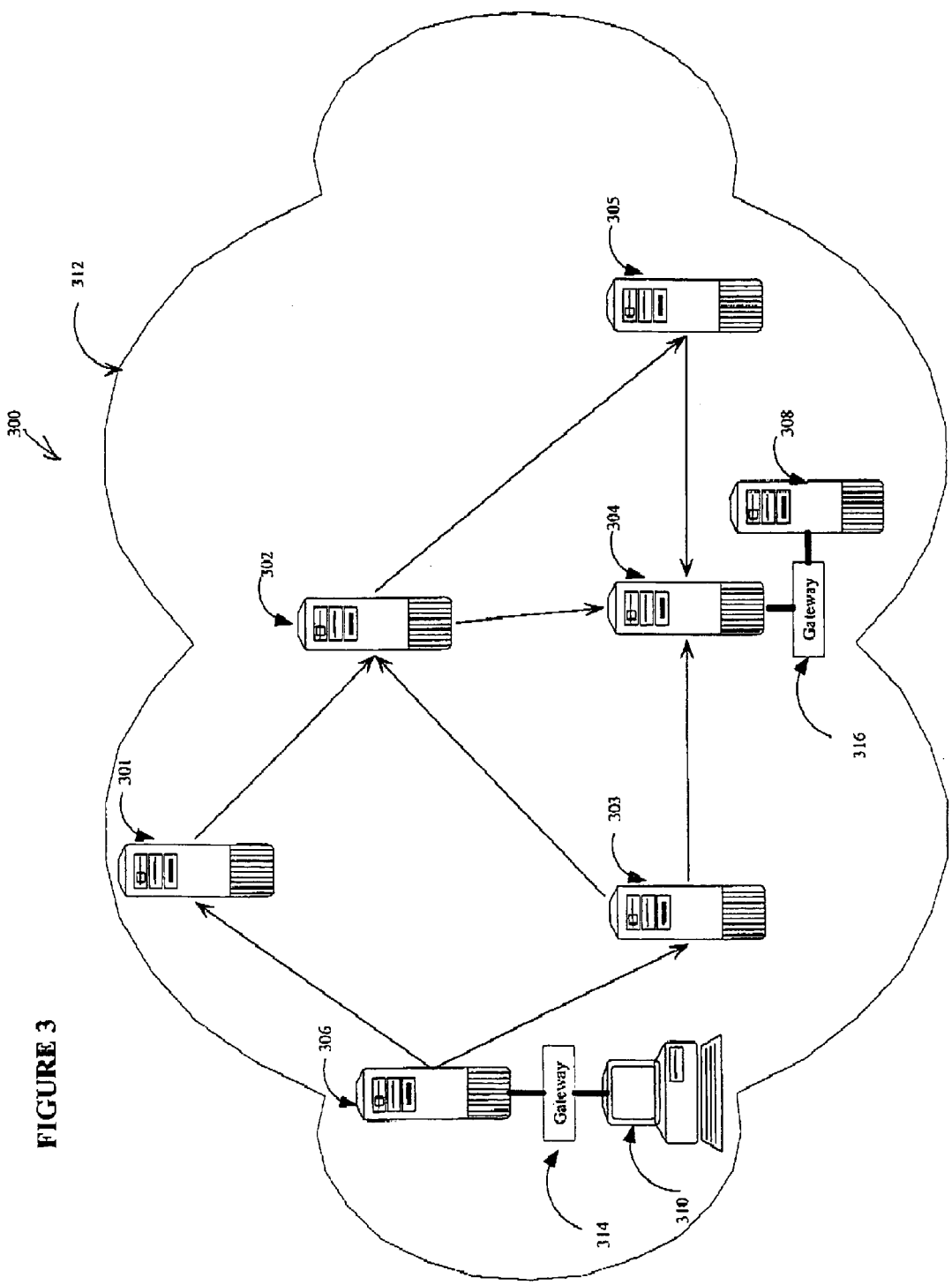
FIG. 3 presents a schematic representation of a system for providing secure-transactions over an insecure communication network in accordance with an embodiment of the present invention.

A schematic representation of a system for providing secure transactions over an un-managed insecure communication network is shown in FIG. 3. The system is hereinafter referred to as a Virtual Transaction Network (VXN). As shown in FIG. 3 the VXN 300 consists of a plurality of computers, or nodes, interconnected over a packet-switched communications network. The nodes utilized in the VXN system are referred to as master nodes. The components utilized in the within the master nodes are described in further detail below. Referring again to FIG. 3 one can see that the VXN includes six master nodes (301, 302, 303, 304, 305 and 306). Also shown in FIG. 3 is a transaction server 308 and a user interface 310 attached to master nodes 303 and 305 via gateways 314 and 316 respectively. These components are also described in further detail below.

FIG. 3 also shows the various nodes within the VXN being interconnected over the Internet 312. The VXN, however, is not limited to being connected over the Internet and could, therefore, be applied to any public packet-switched network or combination of private and public packet-switched networks.

In order to effect a service offered by the VXN, an end user must first be able to communicate with the network. The end user performs this task by utilizing a user interface 310 which is attached to one of the master nodes 306 in the VXN via a gateway 314. As will be apparent to one skilled in the art, a gateway is a device that functions as an entrance or exit point to a network. One should also note that while the user interface shown for accessing the VXN system is a computer terminal 310, the invention is not limited in this manner. The end user could just as easily access the VXN using a number of different devices including a lap-top, smart terminal, personal digital assistant, Internet-ready telephone, telecommunications switch, World Wide Web server, or other similar interfaces as are shown in the art. Furthermore, one should note that the aforementioned user interface and gateway do not have to be physically distinct from the corresponding master as shown in FIG. 3. These components could easily be incorporated into the master node itself.

Once the user has decided to utilize the system, the VXN must be able to communicate information between an end user and a transaction server 308. A transaction server is computer or device on the network that manages the network resources provided by the VXN system. Typically a server consists of a CPU for performing the various functions of the server, and a storage device for storing information necessary to the performance of the server. For example, in the context of a VXN providing airline services, the transaction server would perform numerous functions including: providing information about available flights; booking flights; and providing electronic tickets to name a few. As will be apparent to one skilled in the art, a transaction server can be connected to a master node through a gateway 316 as described above. In the preferred embodiment of the invention the aforementioned transaction server also contains accounting means for billing purposes.

Although only a single transaction server is shown in FIG. 3, the present invention could easily include a number of different transaction servers for providing different services. In the case of multiple transaction servers, the VXN would route messages to the appropriate server based on the type of service chosen by the end user. Similarly, one could distribute various parts of a single transaction to different servers as needed. Using the airline kiosk example again, one part of the transaction could be routed to an airline server for finding a ticket, while a second part of the transaction could be routed to a credit card server for purchasing that ticket.

One should also note that although FIG. 3 depicts the transaction server 308 as being a single computer, the invention is not limited in this manner. Rather, the server could consist of a number of networks or computers which are interconnected to provide the previously mentioned transaction server functions.

Referring again to FIG. 3, one can see that transaction server 308 is shown as being physically distinct from its corresponding master node. One should note, however, that this is purely for demonstration purposes as the functions of the master node and its corresponding transaction server could easily be carried out by a single computing device.

The master nodes 301, 302, 303, 304, 305 and 306 from the core of the VXN system. The master nodes, similar to the transaction server 308, are servers consisting of a CPU and an associate storage device. In a preferred embodiment the master nodes are stored at physically secure locations. This means that the master nodes are stored in such locations that adequate and reliable cooling, backup power and physical security are provided. The master nodes perform various functions related to the operation of the VXN which are outlined below.

First, each master node is capable of packetizing electronic messages for transmission over the VXN and assembling packetized messages which are received. Note, the process of packetizing messages typically occurs in the first node of transmission path that receives the electronic message. Similarly, the process of assembling pacektized messages typically occurs in the final node of a transmission path only (i.e. the master node linked to the destination transaction server). The concept of determining the transmission path for routing data packets is described below in further detail with respect to FIG. 5. One should note, however, that it is not necessary that every master node be capable of performing the packetizing and assembling functions. Intermediate master nodes in a transmission path do not need this function because they will only be receiving and transmitting individual data packets. In the preferred embodiment of the invention, however, each master node is capable of these functions so that these intermediate nodes are capable of becoming a transaction or client node as the need arises. The process of packetizing and assembling is well known to one skilled in the art of packet-switched network communications.

Second, each master node is acts as a router to forward message packets to adjacent nodes based on a transmission path determined by the VXN. A flowchart outlining the various steps for transmitting and receiving message packets in a preferred embodiment of the invention is described in further detail below with reference to FIGS. 5A and 5B.

As part of the transmitting and receiving capabilities of the master nodes, each master is further capable of performing a number of related functions. For example, when transmitting a message packet, each master node is capable of attaching or including a checksum and unique message ID with each data packet. As will be apparent to one skilled in the art, a checksum is utilized to ensure the overall validity of a packet after it is transmitted. The message ID, on the other hand, identifies the data packets as being part of the original electronic message.

Another capability of the master node which is related to the transmitting and receiving functions is the ability to store transmitted and received data packets. The purpose of storing a data packet along with its message ID is to ascertain and restore the network to its state immediately preceding a system failure. This is achieved by storing the aforementioned information along with a timestamp. By performing this function the VXN ensures that the loss of one or more master nodes does not affect the integrity of the network. The updating of a VXN following a system crash is described below in further detail.

By storing copy of a data packet and its corresponding message ID the VXN can also ensure that each transaction over a transaction network only occurs once. This is achieved by identifying and discarding multiple transmissions of the same data packets which are received within a specified time period. The VXN achieves this by merely attaching the same message ID to data packets in the event that an end user commands the same function multiple times within a specified time period. In the context of a VXN providing banking services, this is an important feature, as it can prevent an end user from unwantedly debiting of an account twice during the same transaction.

In order to be able to restore the network to its state immediately preceding a system crash each master is, therefore, capable of locking the VXN and performing a system update. A system update is a process whereby an updating master sets flag in each other master within the VXN to ensure that no other system updates can occur. The master then directs the masters to "roll-back" their operations to a time period immediately preceding a system failure. This is achieved by utilizing the aforementioned timestamps, message IDs and data packets stored in the various master nodes. By performing this task, therefore, the system can continue operating notwithstanding the loss of a node or several nodes. In a preferred embodiment of the invention information such as the data packets, time stamps and message IDs are periodically purged from the masters as they become outdated. For example the aforementioned information could be purged every T seconds wherein T is the greatest latency expected in the network. When restarting a master after a system failure for example, that master must be capable of cleaning all locks it may have acquired before it crashed. This is to allow other masters to update the other nodes in the VXN, particularly the failed node.

In order to provide security measures to the VXN, each master node must also be capable of performing packet encryption. The encryption algorithm utilized in the preferred embodiment of the invention is also described in the flowcharts presented in FIGS. 5A and 5B. To effect the encryption process the master nodes are programmed with a set of encryption re-start keys and an encryption algorithm which are stored in their associated storage device. The encryption re-start keys are utilized to initiate the encryption algorithm. The encryption algorithm is designed to define each successive encryption key utilized for encryption data packets. In this manner a dynamically changing encryption system is provided thereby adding an additional level of security. For example, suppose that a computer hacker intercepts an encrypted packet and determines its corresponding encryption key. That key would merely allow the de-encryption of that particular packet. This is because the next packet would be encrypted using a different key which is derived from a preceding key. This process of deriving an encryption key would occur by utilizing a key generating algorithm. Thus, in order to decrypt an entire message one would first have to ascertain and collect all of the packets of a particular message and then determine the underlying encryption algorithm used to encrypt the other packets. This is clearly more difficult that merely ascertaining a single encryption key. Furthermore, in the event that an encryption key and the encryption algorithm were ascertained by an unauthorized user, the VXN could be easily implemented with a new key generating algorithm and set of restart-keys to thwart any successive security breaches. The process of changing the encryption algorithm or restart-keys occurs as part of the aforementioned system update procedure.

Finally, each master node is capable of periodically transmitting "dummy" packets over the network. Dummy packets are identical in form to legitimate data packets and are transmitted for the purpose of determining the capacity of a path connecting a master node to a transaction node. Note, this dummy transaction function is not the same as a PING (Packet Internet Groper) function which is well known in the art. A PING function merely determines whether a physical connection exists with respect to a specific IP address. The dummy packet utilized here, however, is a complete transaction. Thus, the dummy function provides a full scale measure of the transmission and computation latencies of a particular path in the VXN. The dummy process, therefore, spans all seven layers of the OSI model. This is superior to the PING function which only spans the lowest three layers. In a preferred embodiment of the invention a master performs the dummy function by sending a dummy packet to a transaction node via a randomly selected outbound edge and waiting for a reply. An edge is hereinafter defined as a communication link between two adjacent nodes. A reply from a transaction node to a sending master node then provides the sender with information regarding the capacity of the particular path. The method for performing the dummy function in the preferred embodiment of the invention is described below with respect to FIG. 4. As will be apparent to one skilled in the art, the capacity or "goodness" of a particular network path is a measurement of the available throughput, response-time and reliability of the path. Similarly, the absence of a response can notify the VXN that a particular node or link is not functioning.

In the VXN system, each master node performs the "dummy" function whenever a temporal threshold has been exceeded since a last message has been received. For example, a dummy transaction could be sent whenever the expected upper limit for the round trip delay time for an incumbent edge has been exceeded. The round trip delay time is a concept well known in the art. As a result of the dummy function being performed at regular intervals, the VXN can, therefore, dynamically respond to the changing network capabilities of the Internet. Thus, the VXN can continually transmit packets via differing paths according to the cheapest and least loaded route. With each packet taking a potentially different route, the VXN can optimally load balance its network traffic while at the same time making it increasingly difficult to intercept an entire message.

In the preferred embodiment of the invention the selection of the routes between nodes occurs on a pseudo-random basis dependent upon the capacity of all paths in the network. The probability of selecting an edge for transmission is proportional to the relative goodness of that edge to all other edges which are linked to the destination master node (i.e. the master node linked to a required transaction server). This method of obtaining the capacity information utilized in this gleaning algorithm is explained in further detail below with respect to the flow chart presented in FIG. 4. As will be apparent to one skilled in the art, however, the invention is not limited to using a gleaning algorithm and could easily utilize other routing algorithms known in the art such as dumb routing or flood routing to name a few.

Figure 1:
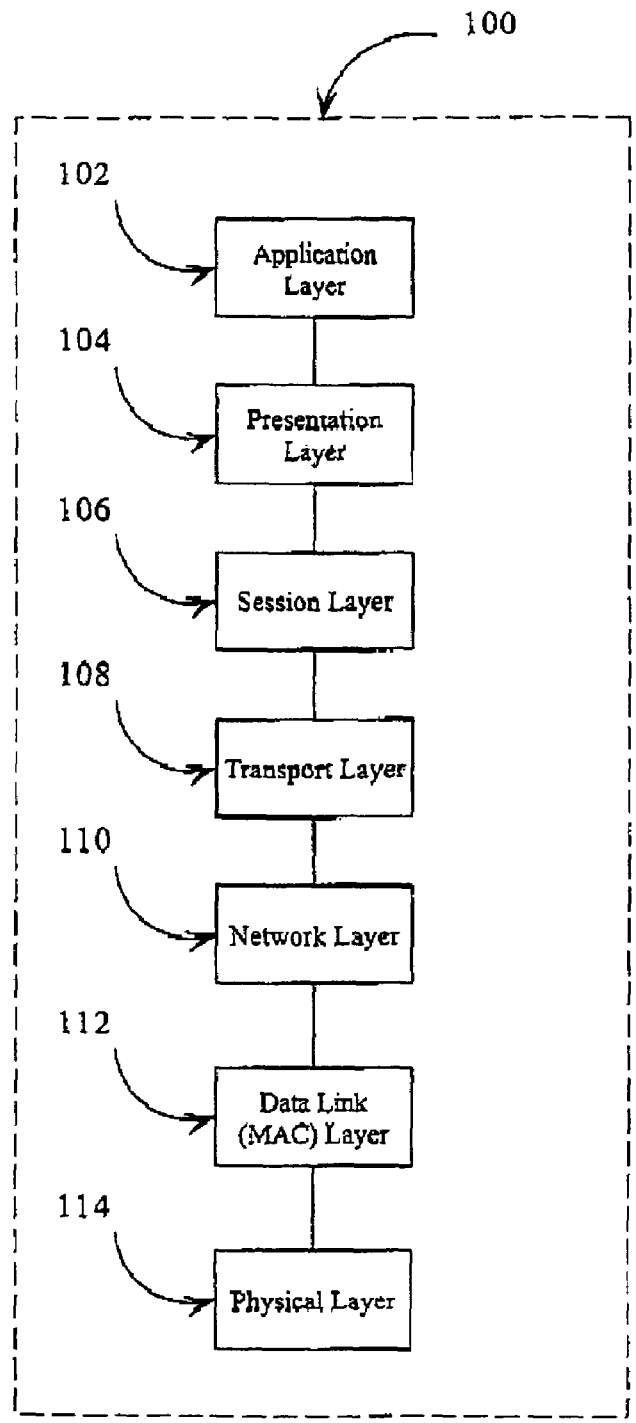
FIG. 1 presents a schematic representation of the Open System Interconnection (OSI) standard.
Figure 2:
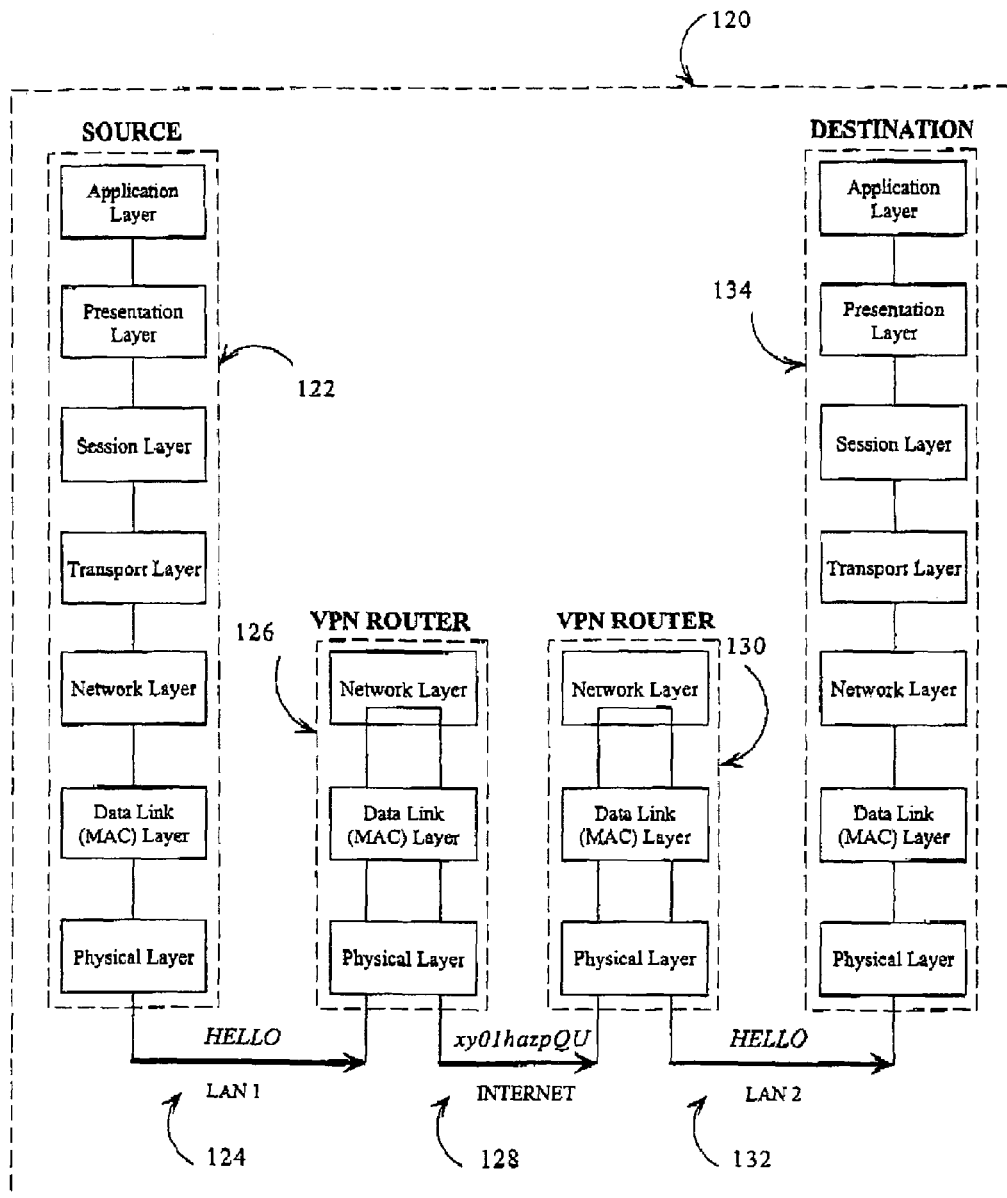
FIG. 2 presents a schematic representation of data being communicated over a Virtual Private Network as is known in the prior art.

This VXN system described above, therefore, is an improvement over VPN's known in the prior art for a number of reasons. First, the VXN spans all seven layers of the OSI model shown in FIG. 1. This means that the VXN functions as a distributed multiprocessor machine which able to learn and adapt to the changing realities in the underlying packet-switched network and the VXN itself. Furthermore, the system provides superior security measures as it provides a dynamically changing and adaptive encryption algorithm for transmitting data-packets. The VXN also provides additional security measures by transmitting data to server nodes in a pseudo random fashion. Finally, the system is superior to VPN's in that it enables the network to recover from lost data, failed hosts or system crashes by recording the various messages transmitted and received at a particular node along with a message ID and a time stamp.

Figure 4A:
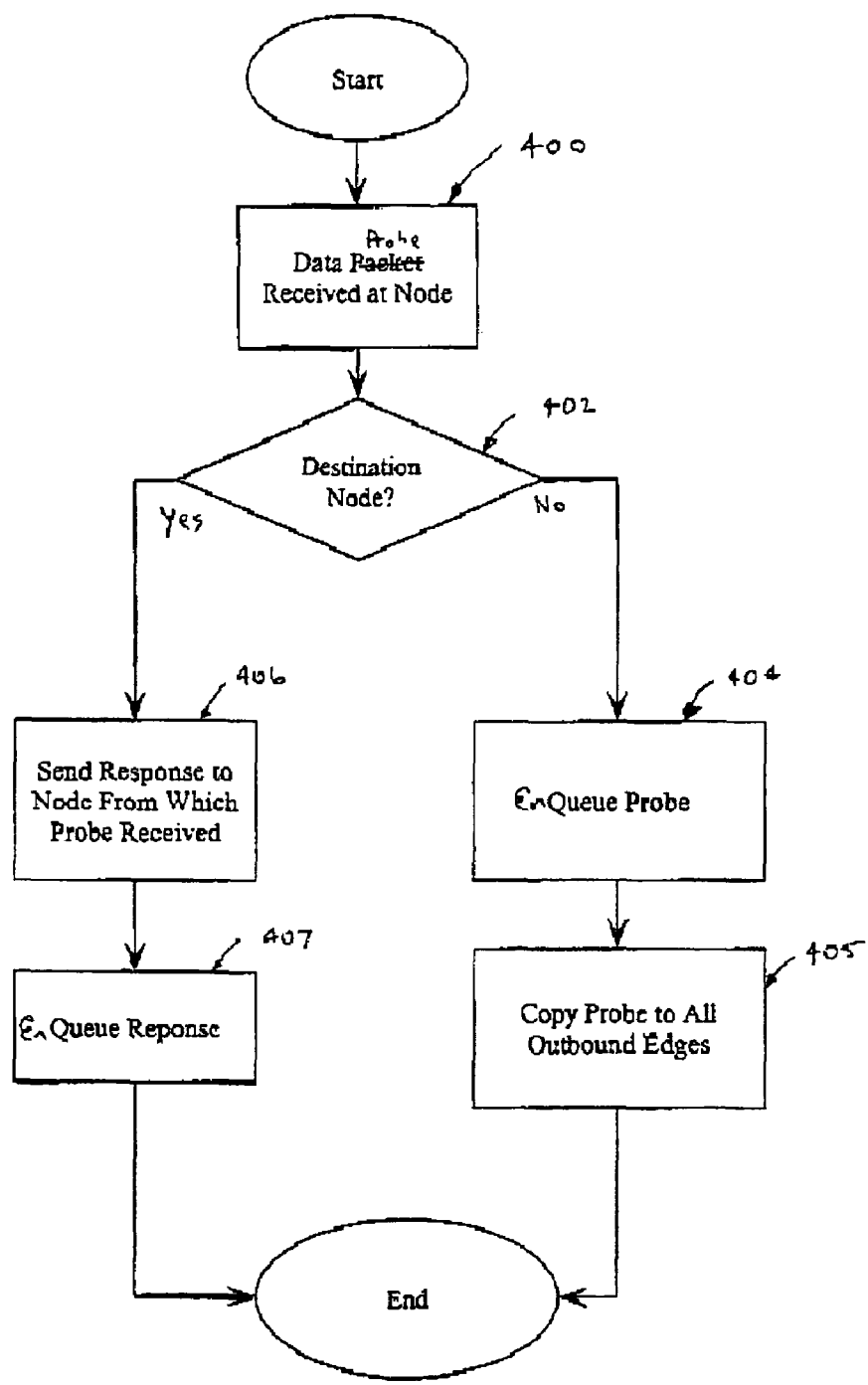
FIG. 4A presents a flow chart of a method for sending a probe to determine the capacity of a communication path within a system from providing secure transactions over an insecure communication network in a preferred embodiment of the invention.
Figure 4B:
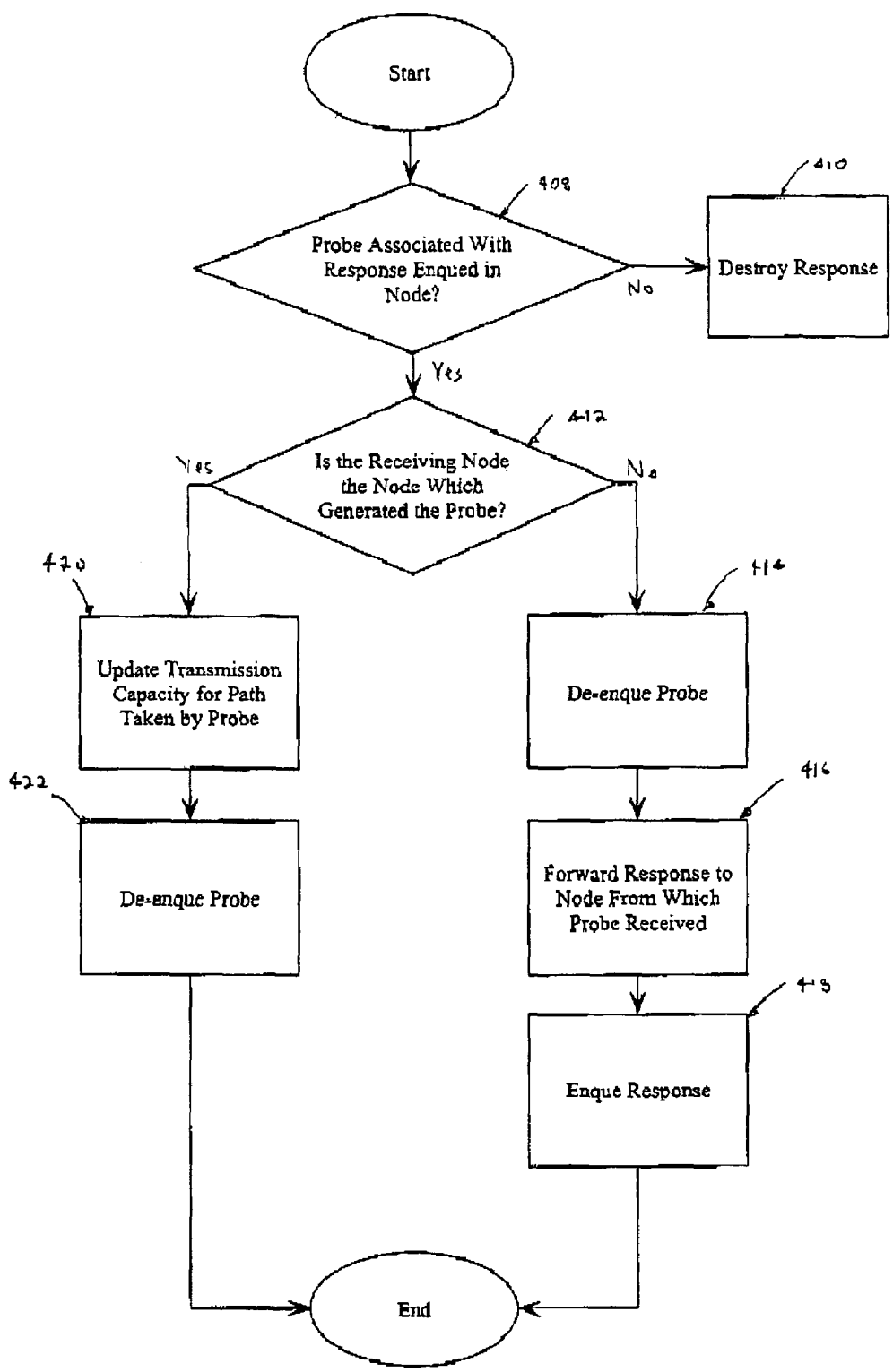
FIG. 4B presents a flow chart of a method for sending a response to a probe to determine the capacity of a communication path within a system for providing secure transactions over an insecure communication network in a preferred embodiment of the invention.

FIGS. 4A and 4B present flowcharts for the method steps taken by a master node when performing the dummy function. As mentioned previously with respect to FIG. 3, a dummy function is a process whereby a master sends out a dummy packet of information to a destination transaction server and awaits a reply. A "dummy" packet which is sent out to a destination transaction is hereinafter referred to as a "probe". Similarly, a reply to such a probe is hereinafter referred to as a "response".

Referring now to FIG. 4A a flowchart for the method steps taken by a node when receiving a probe is presented. The method initiates at step 400 wherein a probe is received at a node. At step 402 the receiving node then determines whether it is the destination transaction node to which the probe is being sent. If the receiving node is not the destination node a copy of the probe and an associated timestamp is stored in the node at step 404. When a packet is stored in a node along with a timestamp it is "enqued". After enqueing the probe, the receiving node then copies the probe and transmits it along each of its associated outbound edges at step 405. For example, referring to FIG. 3 one can see that if a probe destined for node 304 is received at node 302, a copy of the probe will be sent to both node 304 and 305.

If, on the other hand the receiving node is the destination node, that node then sends a response to the adjacent node from which the probe was received at step 406. When this response is received by the node which sent the probe, that sending node will then know the capacity of the particular path taken by the probe. At step 408 a copy of the response is enqued in the receiving node for the aforementioned updating purposes.

Referring to FIG. 4B a flow chart presenting the steps followed by a node receiving a response is shown. The method initiates at step 408 wherein the receiving node determines whether a probe associated with the response received is enqued in the node. If no associated probe exists, the response is merely destroyed at step 410. Upon verifying that an associated probe exists, the method proceeds to step 412 wherein the receiving node determines whether it is the node which generated the probe. If the receiving node is not the generating node, the receiving node de-enques the probe at step 414. After de-enqueing the probe, the receiving node forwards the response to the adjacent node from which the original probe was received at step 416. Finally, a copy of the response is enqued in the receiving node at step 418.

In the event that the receiving node is the node which generated the probe, the node updates the capacity for the path taken by the probe to the destination node at step 420. In the preferred embodiment of the invention the capacity determination is performed by an exponential averaging algorithm which is well known in the art. Following the performance of the update, the receiving node de-enques the original probe at step 422 is then de-enqued and the method terminates.

Figure 5A:
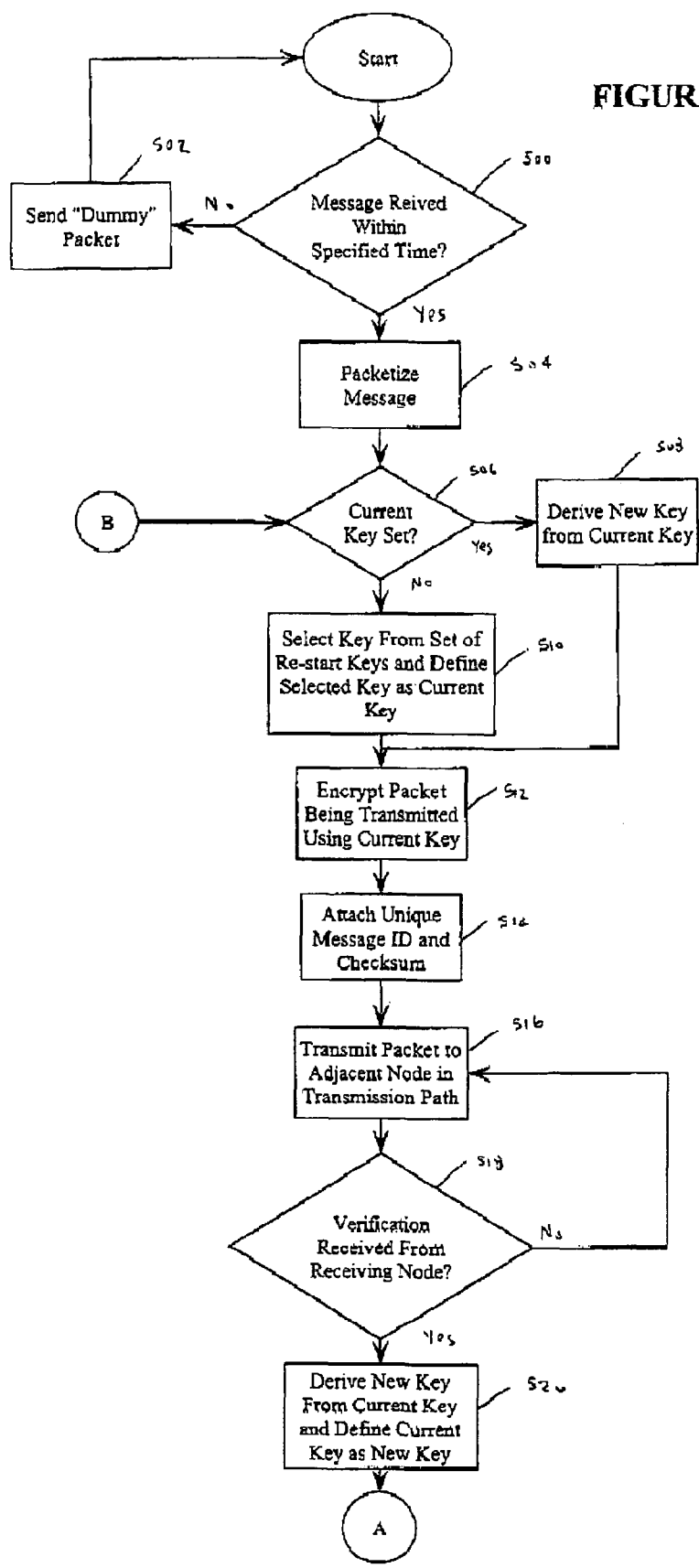
FIG. 5A presents a flow chart of a method for transmitting a message over a system for providing secure-transactions over an insecure communication network in a preferred embodiment of the invention.
Figure 5B:
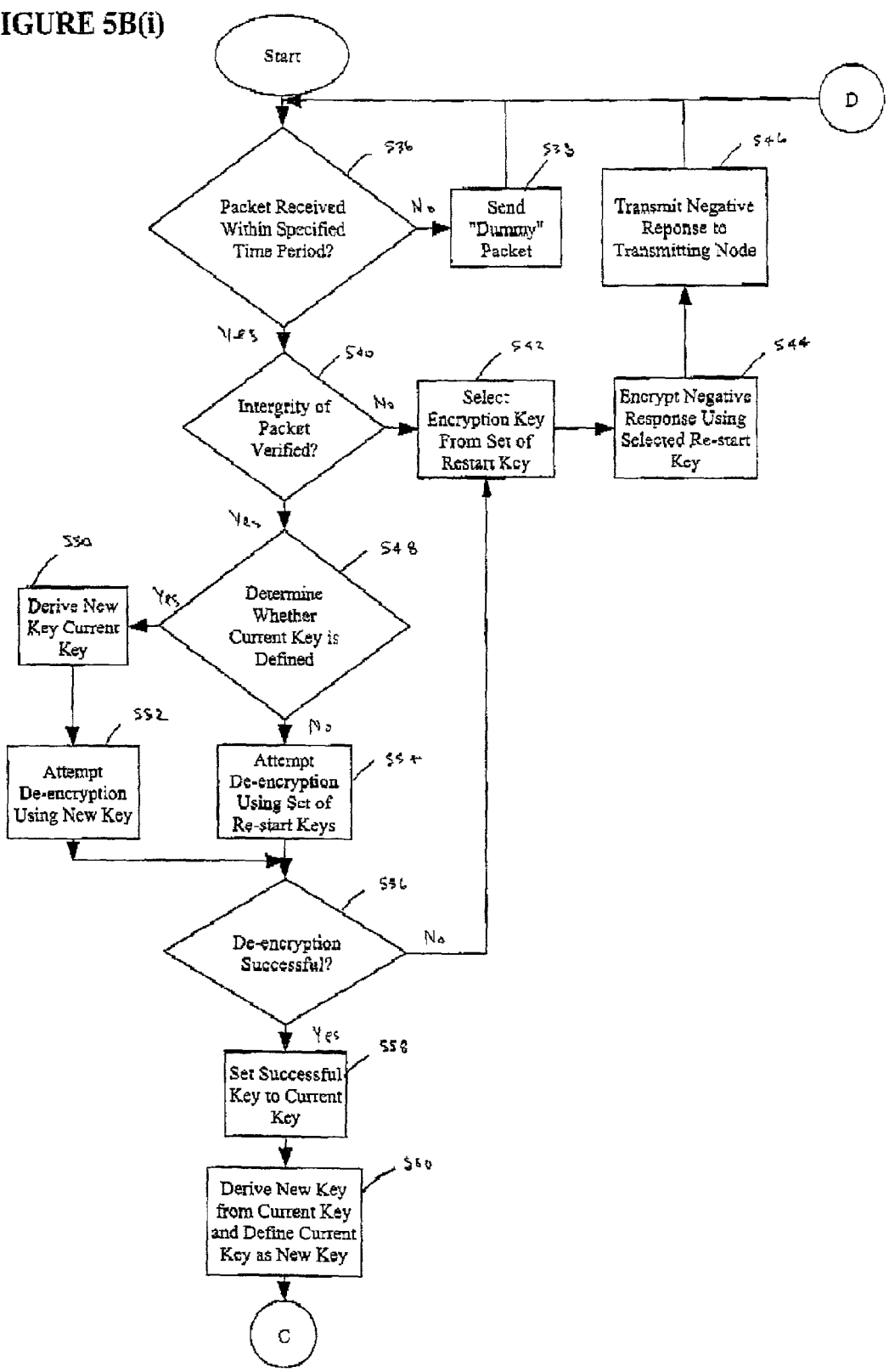
FIG. 5B presents a flow chart of a method for receiving a message over a system for providing secure-transactions over an insecure communication network in a preferred embodiment of the invention.

FIGS. 5A and 5B present flowcharts for the method steps taken by a master node for transmitting a message and receiving a packet respectively. Beginning with FIG. 5A, a method for transmitting a message begins at step 500 wherein the transmitting node determines whether a message has been received within a specified time period. This step is performed by utilizing a clock within the CPU of the master nodes which begins when the node is initialized. Proceeding to step 502, if the message has not been received within the specified time period, the transmitting node determines the capacity of a path to a transmission node by sending a "dummy" packet along a randomly selected outbound edge. As part of "dummy" function, the transmitting node resets the timer for prescribing when the next "dummy" packet is sent. If, however, a message is received within a specified time period, the transmitting master node proceeds to the next step of the methodology wherein that node packetizes the received message 504.

After packetizing the message the method proceeds to step 506 wherein the transmitting node determines whether a current encryption key (CK) is defined in its storage device. As mentioned previously, the CK is utilized for the purpose of determining the next encryption key for transmitting a packet by employing an encryption algorithm. If a CK is already defined, a new key (NK) is derived from the existing CK, using an encryption algorithm, and that key is defined as the new CK at step 508. Otherwise, the transmitting nodes selects a key from a set of restart keys (RK) and defines that key as the CK at step 510. Regardless of which process is used to define the CK, the methodology proceeds to step 512 wherein the packet to be transmitted is encrypted by the transmitting node using the CK.

Once the packet which is to be transmitted is encrypted, the transmitting node attaches a unique message ID and a checksum to the packet at step 514. As mentioned previously with respect to FIG. 3, the message ID and checksum are for purposes of identification and validation respectively. The packet is then transmitted, at step 516, to the next node in the VXN as prescribed by the routing algorithm described with respect to FIG. 4.

After transmitting the packet the transmitting node awaits verification from the receiving node at step 518. If a verification packet is not obtained within a specified time period the transmitting node returns to step 516 and re-transmits the package. Upon receiving a verification packet from the receiving node the transmitting node derives an NK from the CK at step 520 using a key generating algorithm. At step 522 The transmitting node then determines whether the verification is positive or negative by attempting to de-encrypt the verification message using the CK. If the transmitting node is unable to de-encrypt the verification message received that means the verification packet is negative. Upon receiving a negative verification packet the transmitting node attempts to de-encrypt that packet using the set of RKs at step 524. If the transmitting node is successful in de-encrypting the negative verification packet using the RKs, the CK is set to the successful RK at step 526. The transmitting node then returns to step 506 and attempts to re-send the packet. Otherwise, the CK is cleared from the storage device of the transmitting node at ste 528 and the process re-starts at step 506. Packets may be de-encrypted and re-encrypted, using the newly generated key at each node.

Upon receiving a positive de-encryption verification packet (i.e. the CK de-encrypted the verification message) the transmitting node determines whether the integrity of the packet is positively verified at step 530. If the packet integrity is not positively verified, the transmitting node re-transmits the message by returning to step 506. Upon receiving positive verification of the integrity of the packet the transmitting node makes a record of the message ID, the packet, and a time stamp in its associated storage device at step 532. Finally, the transmitting node determines whether all of the packets for a particular message have been transmitted at step 534. If all of the packets have been transmitted, the method terminates. Otherwise, the method returns to step 506 and proceeds with the next packet to be transmitted.

The methodology followed by a receiving master node in the VXN is presented in FIG. 5B. The methodology begins at step 536 wherein the receiving node determines whether a packet has been received within a specified time period. This process occurs in the same manner outlined above with respect to FIG. 5A. Similar to the above methodology, if the message has not been received within the specified time period, the receiving node determines the capacity of a path to a transaction node by sending a dummy packet to the transaction node along a randomly selected outbound edge at step 538. As part of this "dummy" transaction, the receiving master node resets the timer for receiving packets. If a message is received within a specified time period, the receiving master node proceeds to step 540 wherein the integrity of the packet is determined via the checksum received with the message packet. If the integrity of the packet has not been maintained during transmission, the receiving node selects an encryption key from the set of RKs at step 542. The receiving node then uses this encryption key to encrypt a negative response message at step 544. After encrypting the negative response it is transmitted by the receiving node to the transmitting node at step 548. The process then re-starts at step 536 wherein the receiving node waits for a packet to be received.

Upon positively verifying the integrity of the packet, the receiving node determines whether a CK is defined at step 548. If a CK is defined, a NK is derived by the receiving node using a key generating algorithm at step 550. The receiving node then attempts to de-encrypt the packet using the NK at step 552. If, on the other hand, a CK is not defined, the receiving node attempts to de-encrypt the message using the entire set of RKs at step 554. The receiving node then determines if it was successful in de-encrypting the packet at step 556. If the receiving node is unsuccessful in de-encrypting the packet, the receiving node returns to step 542 and sends an encrypted negative response to the transmitting node.

Upon successfully de-encrypting the packet, the receiving node defines the CK as the successful de-encryption key at step 558. The receiving node then derives a KN from the CK using a key generating algorithm and sets the CK to the NK at step 560. The receiving node then creates a positive acknowledgement message which is encrypted using the CK and sent to the transmitting node at step 562.

After a positive acknowledgment message is sent to the transmitting node, a record of the packet received is recorded in the receiving node at step 564. This record includes the message ID, a timestamp associated with the packet and a copy of the packet itself. Once a record of the packet is made the receiving node then determines whether it is the destination node at step 566. If the receiving node is not the destination node, the receiving node then becomes a sending node and begins the packet sending methodology at step 506 (FIG. 5A).

In the event that the receiving node is the destination node, the receiving node determines whether all packets associated with a particular message have been received at step 568. If not all of the packets for a message have been received, the methodology is re-started at step 536. Otherwise, the receiving node assemblies all the packets at step 570 and the methodology is complete.

Further information describing the invention is found in Appendix A.

While particular embodiments of the present invention have been shown and described, it is clear that changes and modifications may be made to such embodiments without departing from the true scope and spirit of the invention. Thus, it is intended that the present invention cover the modifications and variations of this invention provided they come within the scope of the appended claims and their equivalents.

APPENDIX "A"

Terms and Definitions

The VXN is described in a graph-theoretic [2] sense as a directed graph, G, comprising N vertices $V=\{v_i\}$ and M edges $E=\{e_j\}$ representing virtual connections (VC) between vertices (these connections are made in the underlying packet network) with the following properties:

1. A vertex is a computer in the VXN. It may be a client, server, or master.
2. A server is a source or sink of information. A client may request information from a server or update information in a server.
3. At least one vertex must be a master.
4. The set of masters acts to manage the VXN.
5. Edges are either one-way or two-way VCs.
6. Any vertex with more than one incident edge must also act as a router in the VXN.
7. G is irreflexive.
8. A path or route is a sequence (ordered set) of edges that allows the transmission of data from vertices $v_i$ to vertex $v_j$, denoted as i→j.
9. There must be at least one full-duplex path between every vertex and every other 'vertex: $\forall i,j, i \neq j \exists i \rightarrow j, j \rightarrow i$.
10. There must be at least one full-duplex path between each master and at least one other master.
11. A scalar $d_i \in [0,1]$ is associated with each edge $e_j$. Each $d_i$ represents the capacity of the VC $e_j$. Capacity is a heuristic measure that is normalized weighted sum of the available bandwidth, throughput and the reliability of the connection in the underlying packet network forming the VC.
12. G is dynamic—vertices may be added, deleted, edges added or deleted, and the $\{d_j\}$ updated, in a manner as to ensure that G remains consistent with the properties herein.

Routing

The goal of the routing algorithm is to ensure that the following occur:

The VXN utilizes the underlying packet network efficiently.

The VXN routes queries stochastically to reduce the likelihood of entire transactions being reconstructed by a packet interceptor in the underlying packet network to the VXN.

All client-to-server queries are routed through at least one master.

All server-to-client responses are routed through at least one master.

A preferred embodiment of the VXN Routing Algorithm (VRA) consists of the following:

1. An N×M cost matrix, $K_i$, in each vertex $v_i$. Each K (n,m) element of $K_i$ contains the minimum cost of transmitting data from $v_i$ to $v_n$ by the least expensive path from $v_i$ to $v_n$ that begins with edge $e_m$. K (n,m) if $e_m$ is not incident on $v_i$. the set of $K_i$ may be computed using a variety of dynamic programming techniques, such as Bellman-Ford algorithm or the Dijkstra algorithm [1]. The set of $K_i$ matrices is pre-computed and downloaded to all vertices as part of the setup of the VXN. Thereafter the $K_i$ are periodically downloaded to all the vertices by the master in charge of the update.

2. A cost vector derived from $K_i$ that contains the minimum cost of reaching a master via a path that originates along each outbound incident edge to $v_i$.

3. The cost of a path is defined as the sum of the reciprocals of the $d_i$ of the edges that comprise the path.

4. Every message originating in a node of the VXN is stamped with the source and destination address of the message.

5. Every vertex, except the destination vertex, routes a message along one of its outbound incident edges (excepting the edge on which the query was forwarded to it if it is not the originating vertex) to a neighboring vertex in a manner that the probability of selecting outbound edge $e_m$ to route the message to destination $v_n$ is $$P(m) = \frac{K(n, m)}{\sum_i K(n, i)}.$$

Here i includes all outbound edges except the one on which the message came into the node.

6. If the destination address is a wildcard representing the nearest master node, the cost vector to the nearest master (derived in 2, above) is used instead of K (n,m) to compute P(m).

Other embodiments of the VRA may include variations of the above such as adaptive routing schemes where each node autonomously updates its routing functions by either querying its nearest neighbors or by gleaning routing metrics from the data packets that flow through it. Even other routing algorithms such as flood routing and dumb routing are possible though network efficiency may be compromised to some extent.

Data Transmission Format

The following communication format is employed in the VXN, according to a preferred embodiment of the invention.

Every communication along an edge in the VXN involves positive acknowledgement of receipt; retransmissions are generated if the acknowledgment is not received.

The sending vertex encrypts the message (as described later), attaches a checksum and a unique message ID to it and transmits it to the recipient. The recipient verifies the integrity of the message and transmits a positive or negative acknowledgment to the sender citing the message ID in its response. If the acknowledgment is positive, the recipient records the message ID and a timestamp in a transient database which is purged periodically (on the order of 10 round-trip delays down the slowest link to the nearest neighbour). If the acknowledgment is negative no record of receipt is kept.

If the sender receives a negative acknowledgment or no acknowledgment within a time window that is proportional to the round-trip delay of the edge, the message is retransmitted with the same message ID.

A recipient receiving a duplicate message ID from the same sender discards the message and sends back the previous acknowledgment to the sender.

If the recipient is not the destination node, it must forward the message after re-encrypting it with a different key (see below) using the routing criteria previously described.

A timer is associated with the edges of every node. When a packet is sent or received or an acknowledgment transmitted, the timer is reset. If a timer expires for a given edge a dummy packet is generated (whose destination address is the node at the other end of the edge) and transmitted along the edge. With each timeout, the $d_m$ for the link is downgraded (causing traffic to tend to take other routes).

"Ping" packets are periodically transmitted between a node and its nearest neighbours, and the turnaround time is used to update $d_m$ using an exponential-averaging algorithm.

Encryption

Preferably, every edge in the VXN is associated with the following data structure that is common to the vertices it joins:

1. An encryption/decryption algorithm (EA).

2. An algorithm to derive a unique new key using the old key and the plaintext encrypted by the old key. A number of algorithms are available for this purpose, the simplest of which use a conjunction of a number of bits of the old key and the previous plaintext encrypted to derive a seed which is supplied to a key generating algorithm to obtain the new key.

3. A set of restart keys (RK) that is relatively large, but still a small set of all possible keys, such that attempting to decrypt a message using all possible restart keys should be much less than the round-trip time for the incumbent edge.

Preferred encryption methodology:

1. When a vertex transmits a message down an edge for the very first time, it randomly selects a key from the set of RK and records this key as the current key (CK).

2. When a vertex receives a message via an edge for the very first time it sequentially tries keys from the set of RK to decrypt the message until it finds the key used by the sender and records this as the CK. It uses the CK to return an acknowledgment (ACK) to the sender and derives a new key (NK) from the CK as described above.

3. When a recipient cannot decipher a message from a sender, it tries the set of RK and records the successful key as the CK. If the encoding key cannot be found it returns a negative acknowledgment (NAK) using an RK to form the NAK.

4. When the recipient positively acknowledges the receipt of a message to the sender, it derives a new key from the current key and makes the former the current key.

5. When a sender receives a positive acknowledgment from the recipient, it sets the CK to the NK.

6. When a sender does not receive an ACK after several retries, it sets the CK to a random key from RK, chooses a new message ID and retransmits the message.

7. All transmissions, including positive and negative acknowledgment are encrypted.

8. The entire message excepting the message ID is encrypted.

Database Replication and Redundancy

Every master contains a System Database with the following information pertaining to the operation of the VXN:

The set of vertices, V.

The set of edges, E.

A connectivity matrix completely describing the topology of G along with the complete set of $\{d_m\}$. Each node can be updated by any master using a lock database operation and an update database operation that ensure that, if necessary, any subset of V can be simultaneously updated. Each database update operation is reversible to allow any number of nodes to be synchronously updated. If a synchronous update cannot be completed, all databases are rolled-back to their previous state.

The computed set of $\{K_i\}$.

The set of $d_m$ from which the $\{K_i\}$ are derived.

The encryption algorithm and RKs associated with each $\{e_m\}$.

In addition each server preferably contains an accounting database that records its transactions for billing purposes. The Accounting Database and its manipulation have the following rules:

If desired by the application being implemented on the VXN, a server's accounting database may be replicated at a collection of other vertices in G using an incremental synchronous update.

All updates are timestamped.

The following are the properties of the System Database and its manipulation:

Only masters may update the System Database

All system database updates are synchronous operations where all the masters are simultaneously updated. If a master cannot be updated the operation is aborted and none are updated.

Preferably, all system updates are timestamped with a universal time code that is obtained from a highly accurate clock (such as from the Global Positioning System).

If a master is restarted following a system crash, it would compare the timestamp of its system database with another master, and if not current, update its copy of the system database from the nearest master. During the copy the source master's system database would be locked, preventing any other system database updates.

Every master maintains its queue of housekeeping functions (such as downloading the set of $d_m$ from each node, computing the $\{K_i\}$ and uploading these to every node). Periodically, as determined by the timer associated with each housekeeping function, with probability less than unity (depending upon the master's CPU load and the stat of its link), master may select a function to be performed across the VXN. Before it may do this, it must synchronously set a flag in the system database of all masters to ensure that no other master attempts the same function at the same time. It obtains the lock, it must perform the function and release the lock (or release the lock if the function cannot be performed for any reason).

When a master restarts it must clear all locks it may have acquired before it crashed.

It will be appreciated that the above description relates to the preferred embodiment by way of example only. Many variations on the invention will be obvious to those knowledgeable in the field, and such obvious variations are within the scope of the invention as described, whether or not expressly described.

REFERENCES

1. William Stallings, *Data and Computer Communications*, Macmillan Publishing Co., 1991.

2. Gary Chartrand, *Introduction to Graph Theory*, Dover Publications, 1985.

3. Howard A. Seid, et al. "Virtual Private Network," U.S. Pat. No. 5,768,271, 1998.

What is claimed is:

1. A method of providing reliable transactions over a communication network comprising the steps of:

determining a need in a node in a transaction network to update a transmission path capacity indicator between the node and a destination node in the transaction network;

formulating an application layer transaction request message comprising an electronic transaction request message in the node as a probe for the purposes of updating the transmission path capacity indicator wherein the electronic transaction message is a credit card charge authorization message;

selecting one of a plurality of output ports on the node for transmitting the probe packet to the destination node;

transmitting the probe packet to an adjacent node;

receiving an application layer transaction response message from the adjacent node correlated with the probe jacket using a message identifier number;

determining a time duration in the node based on a first time associated with the transmission of the probe packet and a second time associated with the receipt of the application layer transmission response message; and updating the transmission path capacity indicator based on the time duration.

2. A method of providing reliable transactions over a communication network comprising the steps of:

determining a need in a node in a transaction network to update a transmission path capacity indicator between the node and a destination node in the transaction network;

formulating an application layer transaction request message comprising an electronic transaction request message in the node as a probe packet for the purposes of updating the transmission path capacity indicator wherein the electronic transaction message debits a bank account;

selecting one of a plurality of output ports on the node for transmitting the probe packet to the destination node;

transmitting the probe packet to an adjacent node;

receiving an application layer transaction response message from the adjacent node correlated with the probe packet using a message identifier number;

determining a time duration in the node based on a first time associated with the transmission of the probe packet and a second time associated with the receipt of the application layer transaction response message; and updating the transmission path capacity indicator based on the time duration.

3. A method of providing reliable transactions over a communication network comprising the steps of:

determining a need in a node in a transaction network to update a transmission path capacity indicator between the node and a destination node in the transaction network;

formulating an application layer transaction request message comprising an electronic transaction request message as a probe packet for the purposes of updating the transmission path capacity indicator wherein the electronic transaction request message is a debit card authorization request in the node;

selecting one of a plurality of output ports on the node for transmitting the probe packet to the destination node;

transmitting the probe packet to an adjacent node;

receiving an application layer transaction response message from the adjacent node correlated with the probe packet using a message identifier number;

determining a time duration in the node based on a first time associated with the transmission of the probe packet and a second time associated with the receipt of the application layer transaction response message; and updating the transmission path capacity indicator based on the time duration.

4. A method of providing reliable transactions over a communication network comprising the steps of:

determining a need in a node in a transaction network to update a transmission path capacity indicator between the node and a destination node in the transaction network wherein the destination node is operatively connected to a credit card transaction server;

formulating an application layer transaction request message comprising an electronic transaction request message in the node as a probe packet for the purposes of updating the transmission path capacity indicator;

selecting one of a plurality of output ports on the node for transmitting the probe packet to the destination node;

transmitting the probe packet to an adjacent node;

receiving an application layer transaction response message from the adjacent node correlated with the probe packet using a message identifier number;

determining a time duration in the node based on a first time associated with the transmission of the probe packet and a second time associated with the receipt of the application layer transaction response message; and updating the transmission path capacity indicator based on the time duration.

* * * * *